Nov. 19, 1963    B. E. KING    3,110,907
UNITIZED BATHROOM STRUCTURE
Filed Dec. 11, 1961    7 Sheets-Sheet 1

INVENTOR.
B.E. KING
BY
ATTORNEY

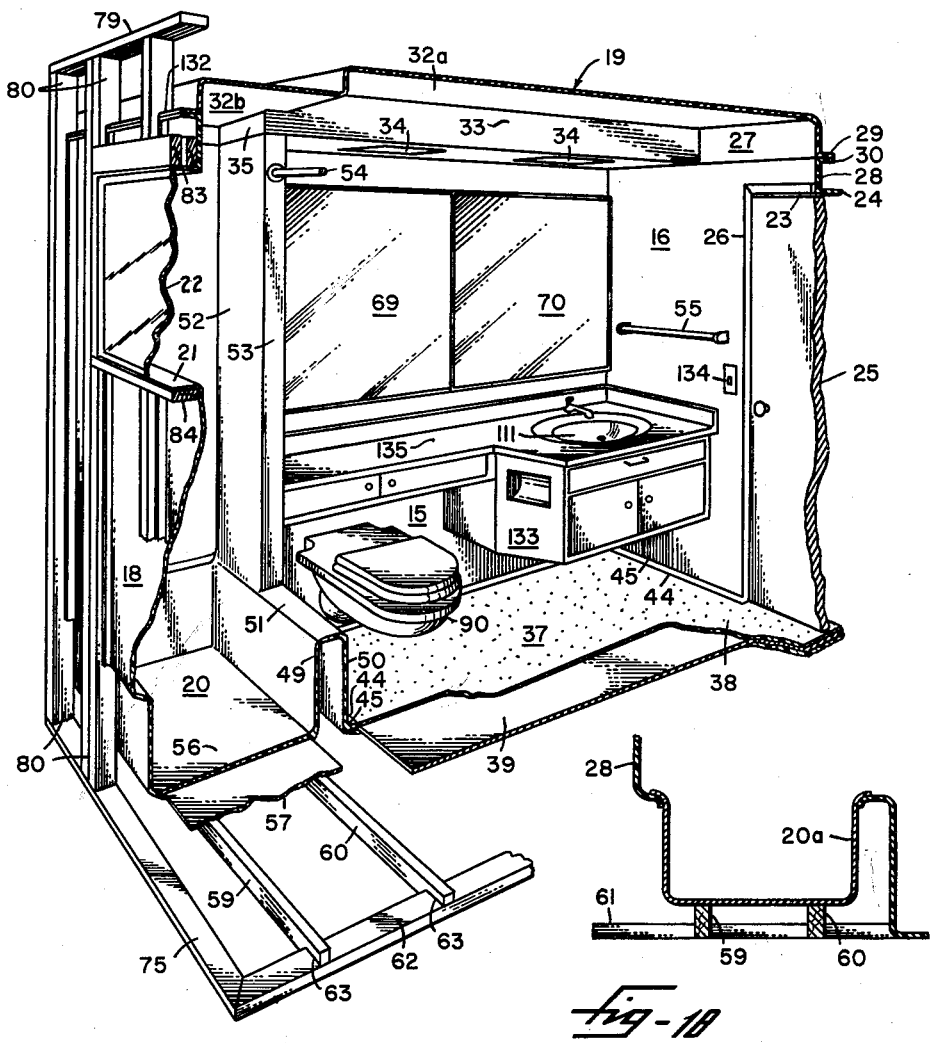

Nov. 19, 1963   B. E. KING   3,110,907
UNITIZED BATHROOM STRUCTURE
Filed Dec. 11, 1961   7 Sheets-Sheet 3
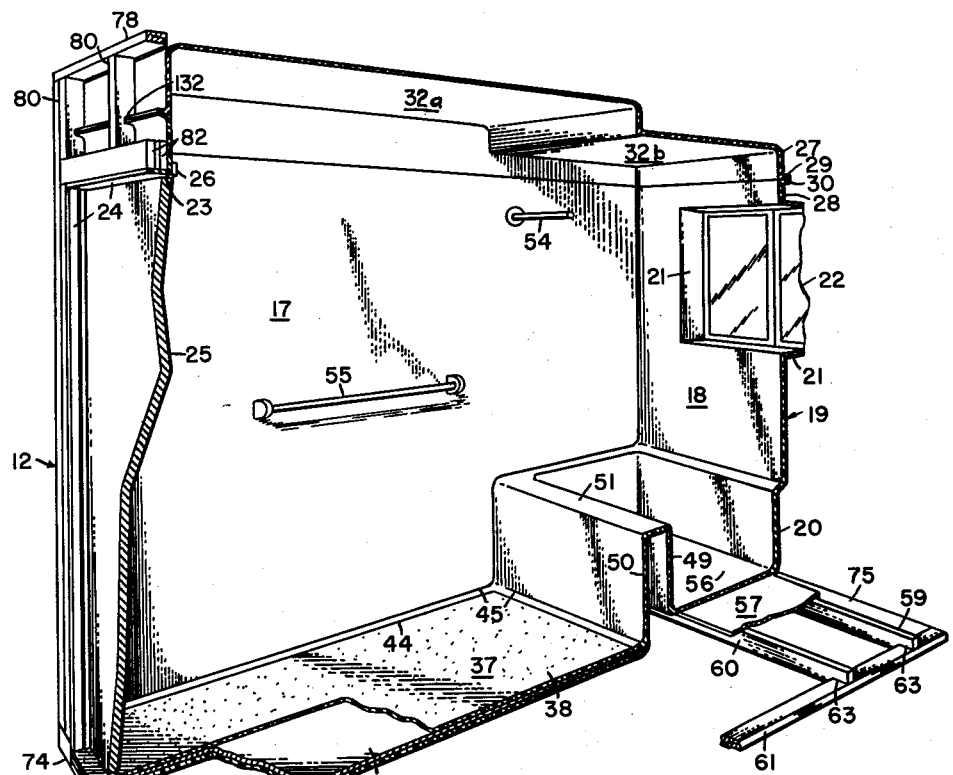
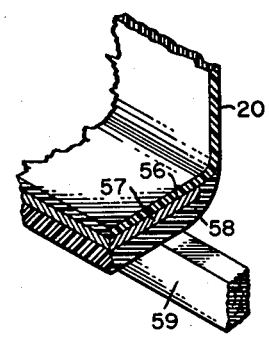
INVENTOR.
B.E.KING
BY
ATTORNEY

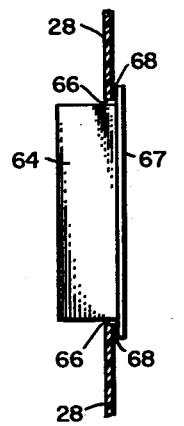
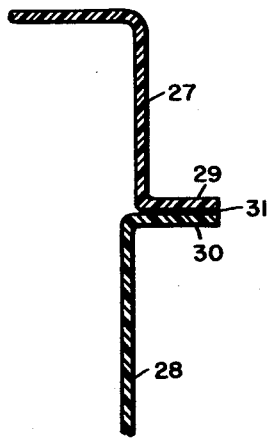
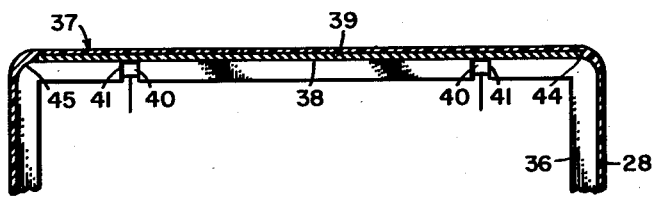
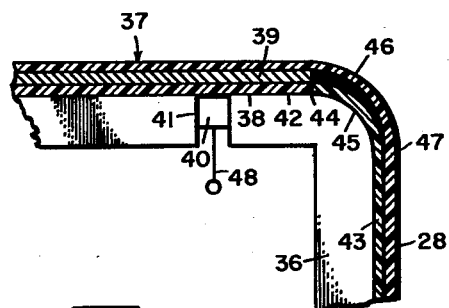

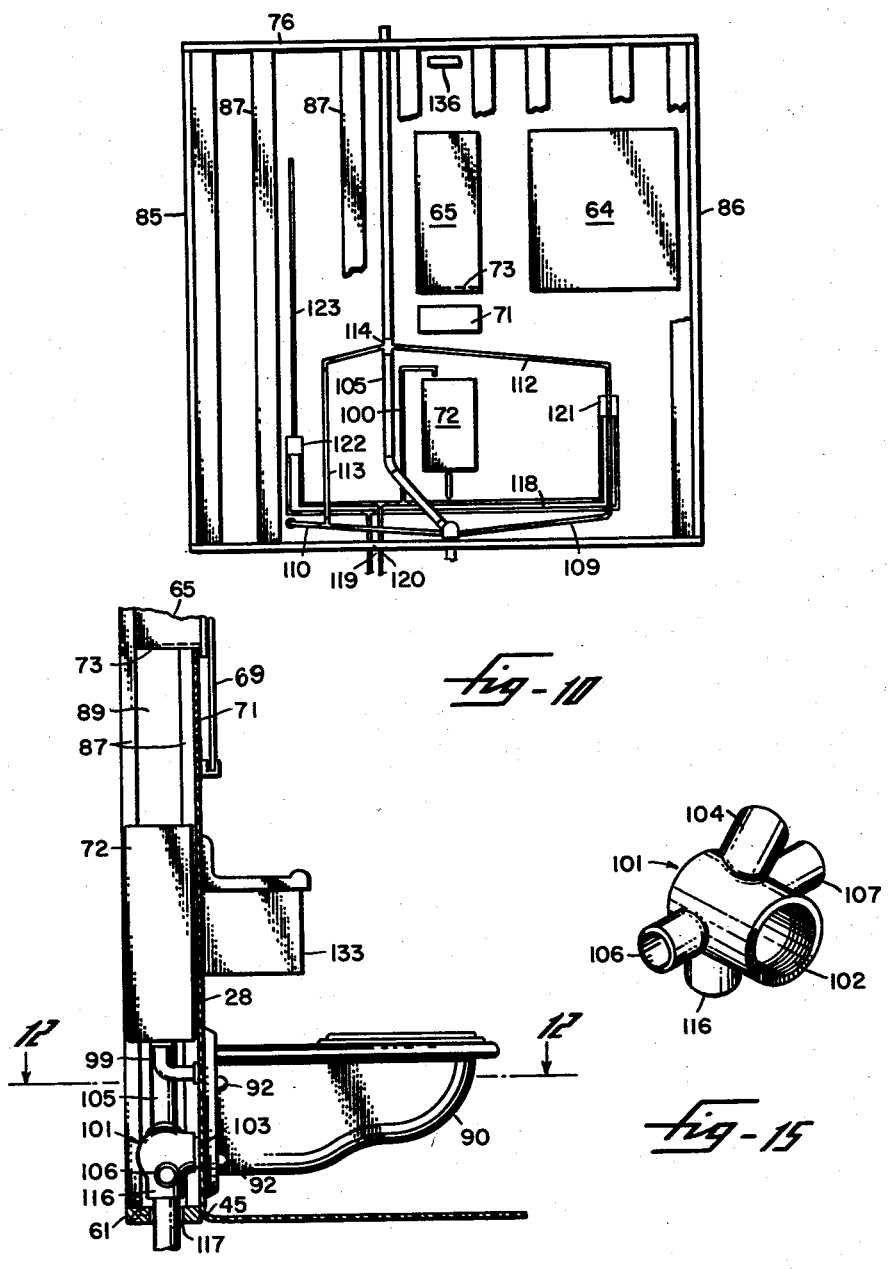

Nov. 19, 1963     B. E. KING     3,110,907
UNITIZED BATHROOM STRUCTURE
Filed Dec. 11, 1961     7 Sheets-Sheet 6
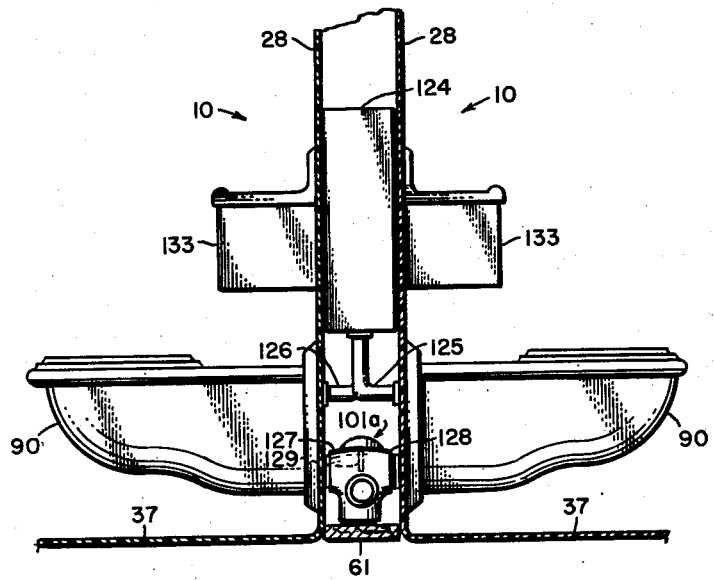
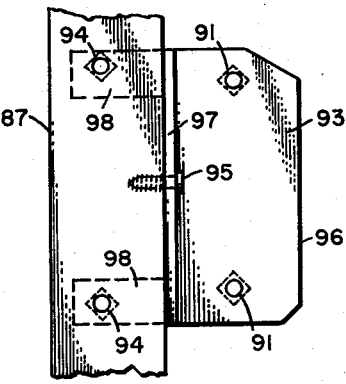
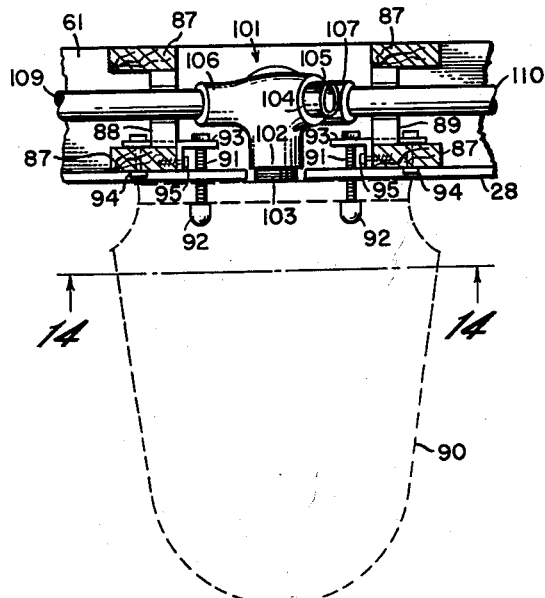
INVENTOR.
B.E. KING
BY George E. Pearson
ATTORNEY Nov. 19, 1963   B. E. KING   3,110,907
UNITIZED BATHROOM STRUCTURE
Filed Dec. 11, 1961   7 Sheets-Sheet 7

INVENTOR.
B.E.KING
BY
*George E. Pearson*
ATTORNEY

United States Patent Office 3,110,907
Patented Nov. 19, 1963

3,110,907
UNITIZED BATHROOM STRUCTURE
Bernie E. King, Riverside, Calif., assignor to Rohr Corporation, a corporation of California
Filed Dec. 11, 1961, Ser. No. 158,414
10 Claims. (Cl. 4—2)

This invention relates generally to building construction and more particularly to a fully unitized bathroom structure which readily may be prefabricated at the factory and shipped as a completed unit to a building site where it may readily be installed, incorporated, or integrated as a completed unit with the remaining building construction.

In present on-site construction of bathroom structures, inordinate delays are encountered and excessive costs incurred by reason of the sequential order in which the various craftsmen necessarily perform and complete their respective tasks. Assuming, for example, in the case of a conventional home construction, that the base structure has been completed, whether this be formed of wood and masonry construction or formed as a concrete slab, the carpenters may next move on site and construct the rough frame-in including the setting of the base plates and erection of the studs, etc. The plumbers and electricians may next move in to respectively perform the rough-in of the plumbing and installation of the basic wiring, junction boxes, connections, etc. After exterior walls have been applied, the plasterers and tilers may next move on site to complete the interior walls. Then may return the carpenters to install doors, windows, cabinets, etc. The painters may take over at this stage, and finally the plumbers and electricians will return to install bathroom and light fixtures. All of these sequential operations must be coordinated and spaced in point of time to avoid interference on site between the operations of different craftsmen and to insure that inspection procedures are followed and code regulations observed. These sequential operations and inspections obviously greatly increase the production time of the overall building project and this, in turn, results in increased construction and financing costs.

A general object of the present invention is to substantially reduce and minimize the on-site delays and costs involved in the building of conventional bathroom structures.

An important object of the present invention is to provide a fully unitized prefabricated bathroom structure which may be shipped as a completed unit for on-site integration with the remaining building structures and for connection with established utility lines while requiring only a minimum of installation time and effort.

Another object is to provide a fully unitized bathroom structure which is to be integrated on-site with a building construction and in which the open exterior framework of the unit serves as the crating for the unit during shipping to said site and also serves as the rough-in framing support for the adjacent exterior and interior walls of the building construction thereby to facilitate installation of the bathroom structure and integration thereof relative to the main building construction and to establish connections with the utility lines thereof.

Another object is to provide a fully unitized and prefabricated bathroom unit which may be simply fastened on site to the base structure and framework and simply connected to or tied in with the main utility lines.

Still another object is to provide a fully unitized prefabricated bathroom structure having an exterior wood framework providing rough frame-in support for the adjacent walls of a building structure with which it is to be integrated and having adequate strength, when necessary, to serve as load bearing members for said building structure.

Another object is to provide a unitized prefabricated bathroom structure which is fully completed and embellished on the interior and adapted on the exterior for shipping and for on-site integration with building structures and utility lines.

Still another object is to provide a fully unitized prefabricated bathroom structure complete with windows, doors, cabinets, fixtures, and the like, and readily adapted for integration on site with the remaining building construction.

Still another object is to provide a prefabricated unitized bathroom structure which conforms to local building codes, is completed in every detail on the interior, and may be embellished to any desired extent with appointments and features of beauty to meet the most modern and extravagant of tastes.

Yet another object is to provide novel means of combining interior plastic molded and reinforced structures of variable configuration with exterior wood framing construction to form a unitized bathroom structure.

A further object in a unitized bathroom structure, is to provide novel means for bonding an interior plastic molded shell construction to its exterior wooden frame construction.

Still a further object in a unitized bathroom structure having interior plastic molded shell segments and an exterior studded framework, is to provide novel means for sealing and bonding said molded segments together and to said framework.

An additional object, in a unitized bathroom structure having prefabricated exterior framing construction and prefabricated interior plastic shell construction, is to provide novel means for correlating and coordinating these structures to receive windows, doors, fixtures, and the like.

Still another object in a unitized bathroom having a basic reinforced plastic layup construction is to provide new and improved means for integrating bathroom fixtures and floor structures into the plastic shell, whether or not these be of conventional design.

Additional objects reside in the provision of structural embodiments which are readily and economically constructed on a mass production basis and which permit ease of shipment and on-site installation and integration with other building structures.

Still another object is to provide prefabricated unitized bathroom structures adaptable for on-site use in multiples, as in back-to-back relationship of a pair of such units.

Still another object is to provide a unitized bathroom structure which lends itself to prefabrication and unitary installation of the plumbing line system for the bathroom unit.

Still other objects, features and advantages of the present invention are those inherent in, or to be implied from, the features of novelty residing in the construction, combination, and arrangement of the several parts as hereinafter more fully described and claimed and disclosed in the accompanying drawings illustrating this invention, and wherein:

FIGS. 3 and 4 are views in perspective, partially broken away, with that portion not visible in one of the views appearing in the other;

FIG. 5 is a detail sectional view showing the bonded connection between plastic shell sections;

FIG. 6 is a partial sectional view illustrating the mode of shell fabrication;

FIG. 7 is an enlarged fragmentary view illustrating details of the floor construction appearing in FIG. 6;

FIG. 8 is an enlarged fragmentary view illustrating details of the bathtub construction appearing in FIGS. 3 and 4;

FIG. 9 is a detail view illustrating the mode of cabinet fabrication;

FIG. 10 is a view in elevation of the utility side frame;

FIG. 11 is a somewhat enlarged fragmentary sectional view of the utility side frame illustrating the mode of mounting the flush tank and its associated wall-hung stool;

FIG. 12 is a sectional view taken substantially along the line 12—12 of FIG. 11 and illustrating the carrier supporting structure for the wall-hung stool;

FIG. 13 is a sectional view similar to that of FIG. 11 and illustrating a common utility wall arrangement for two back-to-back unitized bathroom units of the present invention;

FIG. 14 is a detail view in elevation of the carrier bracket;

FIG. 15 is a detail view in perspective and somewhat enlarged of the sanitary drain disclosed in FIGS. 11 and 12;

FIG. 18 is a fragmentary sectional view showing a modified plastic shell and bathtub construction.

Figure 1:
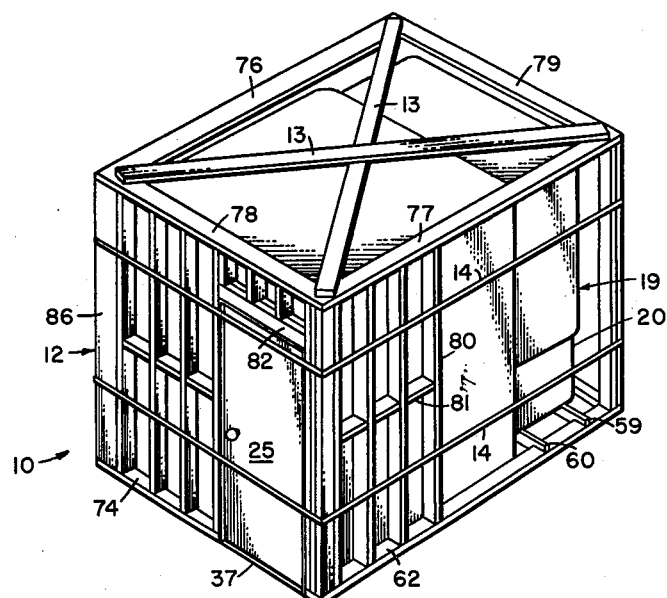
FIG. 1 is a view in perspective of the unitized bathroom structure of the present invention in form ready for shipment as an article of manufacture.
Figure 2:
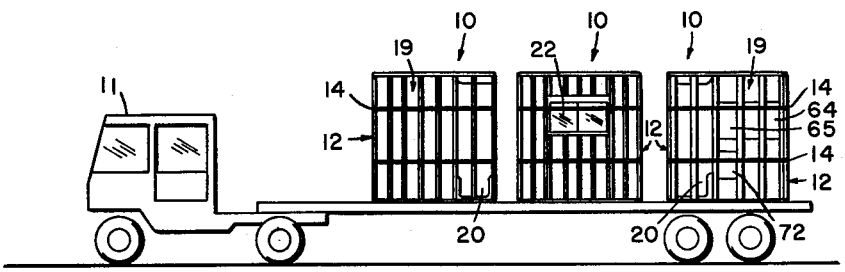
FIG. 2 is a view illustrating a mode of shipment of the article of manufacture disclosed in FIG. 1.

Referring now to the drawings, and first more particularly to FIGS. 1 and 2 thereof, it may be seen that the unitized bathroom structure of the present invention is in the form of a crated article of manufacture, generally designated 10, which may be shipped in one or more units by various means of transportation such, for example, as by the truck 11 disclosed. Thus, in the same manner as a secondary bathroom structural unit such, for example, as a cabinet is prefabricated at the factory as a unitized article of manufacture and installed as a unit in a bathroom being constructed on-site in a conventional manner, the entire bathroom structure of the present invention similarly is prefabricated at the factory as a fully unitized article of manufacture adapted as a unit for shipping to and installation at an on-site building construction.

As will appear more fully as the description proceeds in reference to the other figures of the drawings, the crating is a multi-purpose, multi-function structure which serves not only as crating for the purpose of shipping the bathroom unit but also serves as a structural part of the unit in the form of the more or less conventional rough-in framework generally designated 12. Thus, the framework 12, with the exception of the cross bracing 13 and metal bands 14 which serve only as part of the crating structure, constitutes the exterior construction of the bathroom unit to which the the interior construction, including wall structures, components, fixtures, and the like, is lashed, or otherwise suitably secured, and further serves to support and provide an enclosure for utility plumbing and electrical lines, connections, and fittings, all more or less in a conventional manner adapted to provide the required utilities and load bearing and structural strength, as well as to meet such building codes and like requirements as may be applicable.

As thus contemplated, and as best viewed from the interior as in FIGS. 3 and 4, the unitized bathroom structure of the present invention comprises a fully completed, finished, and embellished interior construction which comprises, as its basic unit or component, a reinforced molded plastic interior shell generally designated 19 which may be molded to various forms and configurations to provide, in addition to the walls 15, 16, 17 and 18, ceiling 32a, 32b and floor 37, an integrally formed and contoured bathtub 20, as shown, or alternatively, to provide an integrally formed shower stall, and in still other cases to also provide an integrally formed lavatory as well as a cabinet therefor. In addition to the foregoing integrally formed parts of the shell, an outwardly extending recess 21 is provided therein for receiving a metal-framed sliding window 22 which preferably may have a flange (not shown) which projects inwardly in overlapping relation to the plastic recess 21 and to which it may be sealed by mastic compound or other suitable means in a well known manner. Shell 19 is also formed with an opening 23 to receive the door frame 24 for mounting the door 25, suitable trim molding 26 being employed to mask and finish the engaging shell and door frame edges.

Shell 19 preferably is made in two sections, one being a ceiling section 27 and the other being a main wall and flooring section 28, the ceiling section terminating in a flange 29 and the wall section terminating in a similar flange 30. As may best be seen in FIG. 5, these flanges are disposed in confronting relation, face to face, with a bonding and sealing material 31 interposed therebetween. This material may be of any type suitable for the purpose and compatible with the plastic material used in the fabrication of the shell, this preferably being polyester resin having an asbestos cement admixed therewith.

Shell sections 27 and 28 may be formed in any suitable manner and of any material which may be suitable to provide thin wall, light weight construction of great strength. It is preferred, however, that the shell sections be formed of a glass impregnated, promoted and pigmented polyester resin adapted for application and layup with a gun in a known manner upon male molds having outer surfaces which conform with the inner surfaces and contours of the shell sections. Thus, the mold for the ceiling section 27 is formed such that, in addition to making provision for forming of the flange 29, and for forming the main ceiling portion 32a, also provides for the lower ceiling portion 32b disposed over the bathtub and shower stall region. A further lowering of the ceiling makes provision for the light soffit 33, in the ceiling surface of which there are provided openings for receiving the recessed lamps 34. It will be noted that ceiling shell section 27 intermediate the flange 29 and the ceiling surfaces 32a and 32b comprises a wall portion having a height which conveniently may equal that of the soffit 33 in the region of ceiling 32a of the main bathroom chamber and having a height equal to that of the soffit portion 35 in the region of ceiling surface 32b of the shower stall section of the bathroom.

Referring now more particularly to FIGS. 6 and 7, it will be seen that the main shell section 28 is formed on an inverted hollow male mold 36 such that the floor construction, which is generally designated 37, is formed at the top of the mold. As may best be seen in FIGS. 7 and 16, the floor 37 is of laminated construction comprising a floor surface layer 38 which may be preformed of any material suitable for the purpose such, for example, as vinyl, linoleum, or the like. In the fabrication of shell 28 on mold 36, floor layer 38 is first contact glued, bonded, or suitably cemented to a tempered Masonite board 39, the bonded connection between the floor layer 38 and supporting Masonite slab 39 in any event being such as to prevent creep of the layer 38 relative to the sub-surface support of the bathroom when installed at the building site. Pressure sensitive cement type locating plugs 40 are next fastened to the layer 38 so that upon positioning the layer and its Masonite backing plate 39 on the upper surface of mold 36, the plugs 40 are received into holes 41 provided therefor in the mold to thus locate the floor layer in proper position relative to the walls of shell section 28. The layer 38 may further be held in position on the mold by use of bonding tape 42 having adhesive on both sides and disposed about the periphery of layer 38 at or near the edge thereof.

Figure 16:
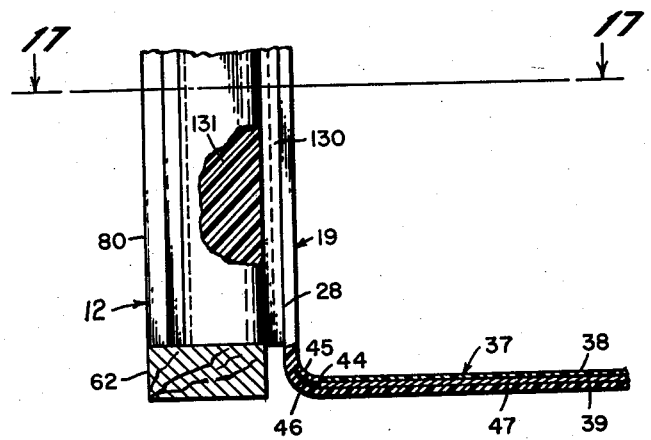
FIG. 16 is an enlarged fragmentary sectional view of the interior sheel construction and of the exterior frame construction and illustrating the mode of lashing of the same together.

With a suitable parting agent applied to the remaining exposed exterior surfaces of mold 36, a gel coat 43 of a suitably pigmented polyester resin is next applied to the mold and this gel coat forms a smooth transition with the floor surface of floor layer 38 as at 44, this transition between the layer 38 and coving portion 45 of the shell wall section 28 being best seen in FIGS. 7 and 16. To provide support for the coving 45, a filler material 46 is applied in the region defined by the edges of layer 38 and hardboard 39 and the exterior surface of the gel coat in the region of coving 45, this filler material preferably comprising an admixture of the poyester resin and an asbestos cement as heretofore mentioned in connection with the seal and bond formed between the adjoining flanges of wall shell sections 27 and 28.

Shell section 28 is then completed by application of the glass impregnated polyester resin to the gel coat, the filler 46, and the Masonite board 39 to thus provide the outer layer 47 of the shell. When the shell is ready for removal from the mold, it merely becomes necessary to remove the plugs 40 by pulling their attached strings 48 to thus release the pressure sensitive bond of the plugs with the floor layer 38 and withdraw the same from the mold apertures 41.

Mold 36 is constructed in such a manner, not shown, that the bathtub 20 is formed with double inner-walls 49 and 50 which are joined to provide the upper edge surface 51 of the shell-molded tub 20, as may best be seen in FIGS. 3 and 4. A vertically extending portion 52 of this double wall construction merges with the soffit portion 35 and together therewith forms a partial wall for the shower stall. Tub surface 51 and its vertical continuation 53 conveniently may support a track for sliding shower doors, or alternatively, the surface 53 may serve to support a shower curtain rod 54, as shown, the other end of the rod being supported on the opposite wall 17, as disclosed in FIG. 4. This wall additionally serves to accommodate a towel rack 55, a second such rack also being supported on wall 16.

As may best be seen in FIGS. 3, 4 and 8, the bottom of tub 20 is reinforced with a tempered Masonite board 57 so that any weight concentrations applied to the bottom surface 56 of the tub are evenly distributed over its surface area. In the tub floor construction as shown, a reinforced plastic layer is applied above and below the Masonite board 57, the upper layer 56 of which is formed concurrently with the fabrication of the aforementioned gel coat 43 and reinforced layer 47 of plastic shell 28. The Masonite board 57 is then applied to this initial plastic layer 56 and the additional layer, or outer plastic bottom layer 58 of the tub, is thereafter applied to the board 57 to thus completely encapsulate the board within the reinforced plastic. This reinforced and laminated bottom portion of the tub 20 is further supported by the exterior framework 12 which comprises a pair of spaced 2 x 6 beams 59 and 60 which are disposed on edge beneath the tub and extended longitudinally thereof to engage the frame base plate members 61 and 62 which are disposed outwardly of the shell 19 at opposite ends of the tub 20. Beams 59 and 60 preferably are notched as indicated at 63 to thus interfittingly engage the base plate members 61 and 62.

A modified and structurally integrated bathtub-shell construction in which the tub-cavity portion 20 of the shell 28, as disclosed in FIGS. 3 and 4, is eliminated and replaced by a conventional steel tub 20a, is disclosed in FIG. 18, tub 20a being simply positioned within the shell aperture in supported relation on beams 59 and 60 as before and suitably bonded to the confronting surfaces of the shell.

Window recess 21 may be formed in shell section 28 by means of a plug (not shown) attached externally to the mold 36, this plug being withdrawn outwardly of the recess 21 and away from the mold before the shell section 28 is stripped from the mold. Similarly, other plugs (not shown) mounted on the mold 36 and extending outwardly of the exterior surface of the mold may be mounted thereon for withdrawing of the same inwardly into the mold when a cabinet of the configuration such as cabinet 64, FIG. 9, is fabricated around such a plug. As may best be seen in FIGS. 2 and 10, however, medicine cabinet 64 is disposed closely adjacent to a second cabinet 65 which makes it difficult to lay down the impregnated resin and compact the same into the corners defined by the mold 36 and the confronting sidewalls of the cabinet forming plugs. Accordingly, the cabinet structures 63 and 64 preferably are formed separately on their respective plugs or molds which, for this purpose, are separately supported during the layup of the plastic on the molds, that is to say, this is done with the cabinet molds disposed apart from the main mold 36. In this case, referring again to FIG. 9, the plug opening in mold 36 is closed as by means of paper, or other suitable means which can later be removed to provide an opening 66 in the shell wall section 28. This, as should be mentioned, preferably is the means by which the door opening 23 is provided in this shell section 28 and the openings for lamps 34 are formed in soffit 33 of ceiling section 27. Each separately molded cabinet 64, 65 is formed with a flange 67 which serves to limit insertion of the cabinet into the opening provided therefor in shell section 28 and to provide confronting surfaces between which a suitable bonding material may be interposed such as indicated at 68 in FIG. 9.

Cabinets 64 and 65 are normally concealed from the interior of the unitized bathroom by the sliding mirrors 69 and 70, FIGS. 3 and 11. Mirror 69 also serves to conceal a removable inspection plate 71, see FIGS. 10 and 11. Removal of this inspection plate from the interior of the bathroom structure makes the flush tank 72 and its mechanism accessible through this opening for servicing and repairs. Similarly, the bottom 73 of cabinet 65 is so constructed and arranged that it may be withdrawn from the interior of the bathroom to further make this mechanism available for service.

Returning again to the exterior construction, the conventional rough-in framework 12, as herein disclosed, preferably is formed of wood and comprises the aforementioned base plate members 61 and 62 which are joined in the base periphery by base plate members 74 and 75. Similarly, an upper periphery of plate members 76, 77, 78 and 79 are disposed respectively above plates 61, 62, 74 and 75 and interconnected therewith by the usual studs 80, the studs, in turn, being interconnected preferably by firewall members 81, all in a conventional manner. The openings for door 25 and window 22 in the framework are also formed in a conventional manner, the door opening comprising the header 82 and the window opening comprising the header 83 and sill 84.

The bathroom units as shown mounted for shipment on truck 11 in FIG. 2 have been variously positioned so as to show three different exterior sides of the unit. Thus, the center unit discloses the windowed side which is disposed opposite the front side having the door 25 as shown in FIG. 1. The unit on the left, as shown in FIG. 2, discloses an exterior side which corresponds to the other side wall as disclosed in FIG. 1, and the unit on the right of center shows the exterior sidewall construction of the sidewall disposed opposite to that appearing on the left of center, this being the side which accommodates the cabinets 64 and 65 and exterior plumbing fixtures including the aforementioned flush tank 72. Except for this side frame, the remaining three sides of the framework have construction generally similar throughout, being made up of 2 x 4 members, and each side preferably being prefabricated as a unit side frame construction in a conventional manner with window and door openings, for example, being pre-located so as to align with the corresponding openings in plastic shell 19 when the side frames are moved into position thereabout. The remaining utility enclosing side frame, of course, is similarly prefabricated with openings adapted to align with and accommodate cabinets 64 and 65 and flush tank 72 as well as to accommodate the plumbing tree and water lines, presently to be described.

In the construction of the utility side frame, as may best be seen in FIGS. 1 and 10–13, base member 61, upper plate member 76 and their interconnecting end studs 85 and 86 preferably are formed of 2 x 8 construction in order to provide an adequate depth of enclosure for the flush tank 72. Also interconnecting upper and lower plate members 62 and 76 are a plurality of 2 x 4 studs 87 which are disposed flatwise, that is, with their flat faces disposed within the plane of their side frame, and there being provided spaced inner and outer layers of these studs which may best be seen in FIGS. 11 and 12. A pair of studs 88 and 89, for example, bridge the space between inner and outer studs 87 disposed on each side of the flush tank 72, thereby to form with their adjoined studs 87 a channel construction on each side of the tank to thus provide a structure of great strength for rigidly supporting the tank and the wall-hung stool 90, the latter having four apertures for receiving the bolts 91 which extend through these openings to be engaged by the stool mounting nuts 92. Bolts 91, in turn, are secured, preferably as by welding, in the region of their heads to a pair of carrier brackets 93.

Carrier brackets 93, in turn, are secured as by bolts 94 additionally secured as by the lag screws 95 to its associated studs 87. The configuration of carrier bracket 93 for this purpose best appears in FIG. 14 from which it may be seen that bolts 91 are welded to a vertically extending plate 96 which terminates in a right angular counterpart 97 having a hole for receiving the lag screw 95. Angle 96, 97 has secured thereto a pair of spaced ears 98 which lie generally in the plane of plate 96 and have holes for receiving the bolts 94.

Flush tank 72 is made of any material suitable for the purpose such, for example, as stainless steel which readily may be fastened in any convenient manner, not shown, to the channel construction 87, 88 and 87, 89. The tank has a water supply connection with the stool 90 in a conventional manner as indicated at 99, the water, in turn, being supplied to the tank from the water line 100, see FIG. 10. The enclosure afforded by the channel members also serves to accommodate the integrally formed sanitary drain generally designated 101 which has an internally threaded outlet 102, FIG. 15, for connection with the stool 90 as by the threaded nipple 103 in a conventional manner.

Drain 101 also has an outlet 104 for connection with the vent stack 105 which, as shown in FIG. 10, extends through a suitable opening provided therefor in upper frame plate 76. Drain 101 further comprises generally diametrically disposed outlets 106 and 107 which connect to the drain pipe lines 109 and 110 for the lavatory 111, FIG. 3, and bathtub 20 respectively. As may be seen in FIG. 10, vent pipe lines 112 and 113 for the lavatory and tub respectively interconnect their respective drain lines with the main vent stack as at 114. Thus, it will be apparent that drain 101 and its connected stack, drain and vent lines form a "so-called" plumbing tree which readily may be prefabricated and mounted in position as a unit within the utility side frame and simply connected to the bathroom fixtures in a conventional manner, after which, on site, there is left only the task of connecting the main outlet 116 of drain 101 to the main drainage line as by a suitable connection extended through opening 117, FIG. 11, provided therefor in base plate member 61.

Similarly, the cold water supply line 100 and the hot water supply line 118, which may enter the enclosure afforded by the utility side frame through the base plate 61 as at 119 and 120 respectively, may also be prefabricated as unitary structures and mounted into position within the utility side frame for connection to the lavatory mixing valve 121 and the bathtub mixing valve unit 122 respectively. It will be noted that a shower line 123 extends from mixing valve unit 122 in a conventional manner.

When the plumbing tree and prefabricated water supply lines have been installed into position within the utility side frame, certain of the outer layer studs 87 which cannot be made a part of the prefabricated utility side frame structure in order to clear the prefabricated utility lines and fixtures, are then installed, and the plumbing lines in some cases may be lashed or otherwise secured to these studs.

In FIG. 13 there is disclosed an arrangement in which a dual bathroom unit comprising two units 10 mounted back to back utilize a common utility wall. In this arrangement, a flush tank 124, common to both units, is provided with two separate chambers having separate water supply lines, not shown, and separate water supply connections 125 and 126 to their respective wall-hung stools 90. A common or dual unit drain 101a is also utilized, this being a modification of the drain 101 in that diametrically opposed threaded outlets 127, 128 are provided for connection with their respective stools as by threaded nipples, in the manner previously mentioned. In order to render this arrangement functionally feasible, drain 101a preferably is provided with a baffle 129 which effectively provides separate flushing action for the two systems bathroom units to enable the same to thus conveniently utilize the same drainage system.

Figure 17:
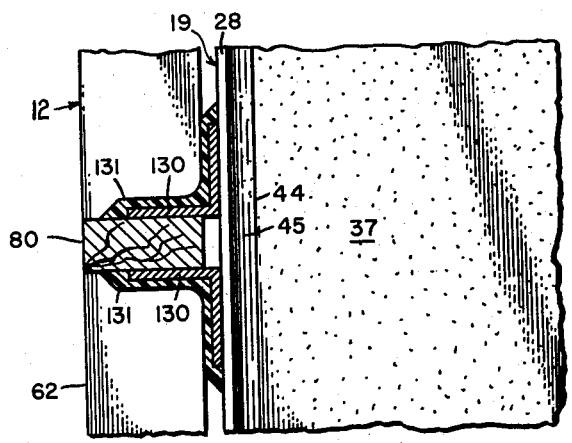
FIG. 17 is a fragmentary view, partially in section and partially in plan of the interior and exterior sections as viewed along the line 17—17 of FIG. 16.

Referring now to FIGS. 16 and 17, there is disclosed thereon a suitable arrangement for lashing the framework 12 and the interior plastic shell 19 together, it being understood, that when the shell is completed, meaning that the shell sections 27 and 28 have been joined together and the cabinets 64 and 65 have been mounted in position, the prefabricated exterior side frames of the framework may be assembled about the plastic shell. In FIGS. 16 and 17, a stud 80 secured to base plate member 62 is shown lashed to shell section 28 my means of polyester resin impregnated strips of fiber glass cloth 130, the excess of resin material thereon which forms the bond being designated 131. In the preparation and application of these plastic impregnated strips, the same are first cut to width and length and then sprayed with the resin much in the same manner as the plastic shell 19 as prepared on the molds. These plastic impregnated strips are then applied with a brush into position in the corners formed by the studs and the exterior wall surface of the plastic shell 19, the plastic resin being worked into and against the shell and stud surfaces and the strips being forced into the corners, as best seen in FIG. 17, by repeated application of the brush, as required. The interior shell construction is thus securely lashed to the exterior framework by bonding the studs to the shell, the joined flange 29, 30 of the shell preferably being cut away as required as at 132, see FIGS. 3 and 4, to accommodate the studs.

In an alternative lashing arrangement, wax paper may be cut to size in strips as in the case of the fiber glass strips 130 after which the glass impregnated resin used in the construction of the shell 19 may be applied to the wax paper with the gun applicator as aforedescribed. The wax paper strips so treated with the resin are then mounted in position on the studs and shell in the same manner as in the application of the fiber glass strips 130, any wrinkles such as may appear being smoothed out with a brush. When the heat of polymerization has softened the wax on the paper, the paper is readily stripped from the studs and shell to leave a glass impregnated bond between the interior and exterior structure 19 and 12 which, in addition to being the full functional equivalent of that disclosed in FIGS. 16 and 17, has the advantage of effecting economies in materials and processing procedures.

Once the interior and exterior basic structures have thus become lashed together, the combined structure may serve to mount secondary structures in a more or less conventional manner. For example, the window frame may be nailed to the framework and sealed to the plastic recess 21, as aforedescribed. The trim 26 and cabinet 133 may be installed and nailed through the plastic shell 28 and into the studs of the framework. In similar manner, the racks 55, wall-hung stool 90, mirrors 69, 70, light switch 134, and other fixtures and components, may be mounted and secured through the plastic shell to the outer framework.

The cabinet 133 preferably is prefabricated as a secondary structure apart from the molded shell, as aforementioned, and may have a Formica, synthetic marble, or like top 135 matched in color and designed with the lavatory 111 which it serves to support and likewise matched with the wall-hung stool 90, these, in turn, being matched and blended, as desired, with colors selected through pigmentation of the gel coat applied in the fabrication of the bathtub fixture and the interior surface of the plastic shell.

Wiring for the various electrical fixtures is not shown but may be installed in a more or less conventional manner, a common outlet box 136, FIG. 10, for example, being preferred for the purpose of establishing connections with the main electrical lines in the on-site installation.

In the on-site installation, it is preferred that an asphalt compound, or like undercoating, be applied to the concrete slab or other sub-structure, and the plastic floor of the unit 10 then be brought into direct contact therewith and in supported relation therewith, it being left to the base plate members to secure the unit in position on the concrete slab or wood sub-floor base structure, the plates being secured as by ram setting in the former and as by nailing in the latter. The upper plates 76 and 79 are provided in a single layer only, it being understood that where the bathroom walls must serve as load bearing structures a second layer will be added on site for this purpose and/or serve to integrate and tie the unitized bathroom structure as hereinbefore described into the on site construction.

From the foregoing, it should now be apparent that there has been provided, as an article of manufacture, a fully unitized and prefabricated bathroom structure complete in every essential detail and refurbished and embellished, as desired, and adapted for ease of shipment and on-site installation, all in a manner to fulfill the aforestated objects of the invention.

It will be understood, moreover, that this invention may be embodied in other forms or carried out in other ways without departing from the spirit or essential characteristics thereof. The present embodiment of the invention is therefore to be considered as in all respects illustrative and not restrictive, the scope of the invention being indicated by the appended claims and all changes which come within the meaning and range of equivalency of the claims are intended to be embraced therein.

Having thus described my invention what I claim as new and useful and desire to secure by Letters Patent is:

1. As a fully factory fabricated article of manufacture, a unitized bathroom structure for integration on-site into a wood studded building structure and comprising a unitary thin walled interior molded shell formed of glass reinforced plastic layup material and requiring exterior support, said shell providing integrally formed interior walls, ceiling, and floor of the bathroom structure, and an exterior wood studded rough frame-in-framework construction enclosing and supporting the walls of said shell and including upper and lower plates and a plurality of interconnecting vertical studs lashed and bonded to said walls by strips comprising structure formed of the same reinforced plastic layup material used in forming said shell, said wood studded framework construction complementing the wood studded framework of the building structure and providing rough frame-in construction and support for the adjacent exterior and interior walls of said building structure, said wood studded framework construction also serving as crating for the bathroom structure in transit from the factory to the building site.

2. A bathroom structure as in claim 1, said integrally formed walls having door and window openings, said exterior framework comprising sills and headers interconnecting certain of the studs to define framed door and window openings aligned with said shell door and window openings, a door, a window, means mounting said window in said aligned window openings, and means mounting said door in said aligned door openings.

3. A unitized bathroom structure as in claim 1, said molded shell walls comprising an outer layer formed of said glass reinforced plastic layup material and having an inner pigmented polyester resin gel surface coat, and said shell floor comprising a structurally integrated composite structure including a conventional bathroom floor surface material which forms a smooth transition with said gel coat and a backing plate support for said floor surface having an outer layer of said reinforced plastic layup material bonded thereto, said plastic shell in the region of said gel coat-floor surface transition defining a coving and having a filler material for supporting the same interposed between said gel coat, said backing plate support, and said outer plastic layer bonded to the backing plate support.

4. A bathroom structure as in claim 1, said shell comprising a first fully integral shell section having said walls and floor formed integrally as a unit therewith, a second fully integral shell section including an integrally formed ceiling and partial wall portions sealed and bonded to the walls of the first section, said first and second shell sections being formed of glass impregnated, promoted and pigmented polyester resin providing an inner pigmented gel coating and surface, and said first section including at least one integrally formed bathroom fixture.

5. A unitized bathroom structure for integration on-site into a building structure as in claim 1 and further comprising bath fixtures supported on said shell and its rough-in framework support, said bath fixtures including a structurally integrated bathtub, and said rough-in framework construction comprising members disposed beneath said bathtub in support thereof and extended in bridging relation to said lower plates for support thereon.

6. A unitized bathroom structure as in claim 5, said shell construction comprising a glass reinforced plastic layup material having an interior polyester gel coat, said bathtub comprising an integral part of said shell and having a supporting bottom plate of rigid nonplastic construction encapsulated in said glass reinforced layup material.

7. As an article of manufacture, a fully factory fabricated and unitized bathroom structure for integration on-site into a building structure and comprising a unitary thin walled interior molded shell formed of reinforced plastic layup material and requiring external support, said shell including a floor, a ceiling, and side walls, an exterior wood studded framework enclosing said shell walls and providing rough-in framing support for said shell and for the adjacent walls of said building structure, said framework comprising a plurality of studs disposed adjacent the exterior surface of said shell side walls, and strip means comprising structure formed of said reinforced plastic layup material and bonded to said studs and to said exterior surfaces of the shell side walls for lashing the studs to the shell.

8. A factory fabricated and unitized bathroom structure for integration on-site into a building structure and comprising an interior construction and an exterior construction, said interior construction comprising a unitary thin walled glass reinforced plastic shell having a floor, a ceiling and side walls, requiring support from said exterior construction, said exterior construction comprising a wood studded framework enclosing said shell side walls and including a plurality of studs each disposed against the exterior surface of one of said side walls for support thereof and lashed and bonded thereto, said wood studded framework providing on-site rough-in framing support for the adjacent walls of said building structure, said framework serving as crating for said bathroom structure in transit of the same from the factory to the building site, bath fixtures supported on one of said interior walls and on said framework support therefor, utility lines and components for said fixtures, said framework support for said one of the walls comprising a utility chamber for housing said utility lines and components, said utility lines having terminals disposed at or above the floor level of said bathroom structure and providing connection to utility lines at the building site.

9. A bathroom structure as in claim 8, said bath fixtures comprising a wall hung stool, said components comprising a water tank for said stool and a prefabricated plumbing tree and water lines for said fixtures and tank.

10. As a fully factory fabricated article of manufacture, a unitized entire bathroom structure for integration into a building structure and comprising an internal plastic shell construction and an exterior wood studded framework bonded to said shell construction and providing rough-in framing support for adjacent walls of the building structure, a wall-hung stool, a carrier for supporting said stool, a water tank for said stool, said wood studded framework comprising an enclosure for said water tank and channel structure for mounting and supporting said carrier.

References Cited in the file of this patent

UNITED STATES PATENTS

| | | |
|---|---|---|
| 1,855,024 | Kersten | Apr. 19, 1932 |
| 1,978,842 | Hooton | Oct. 30, 1934 |
| 2,037,895 | Gugler | Apr. 21, 1936 |
| 2,087,121 | Samelow | July 13, 1937 |
| 2,131,124 | Smith | Sept. 27, 1938 |
| 2,220,482 | Fuller | Nov. 5, 1940 |
| 2,712,164 | Sheffield | July 5, 1955 |
| 2,712,863 | Busch | July 12, 1955 |
| 2,784,417 | Strand | Mar. 12, 1957 |
| 2,907,048 | Gould | Oct. 6, 1959 |
| 2,993,212 | Ruhm | July 25, 1961 |
| 3,015,110 | Treand | Jan. 2, 1962 |